(12) United States Patent
Mortazavi

(10) Patent No.: US 7,000,228 B2
(45) Date of Patent: Feb. 14, 2006

(54) ONLINE UPGRADE OF CONTAINER-BASED SOFTWARE COMPONENTS

(75) Inventor: Masood Seyed Mortazavi, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 717 days.

(21) Appl. No.: 10/052,304

(22) Filed: Jan. 17, 2002

(65) Prior Publication Data

US 2003/0135660 A1  Jul. 17, 2003

(51) Int. Cl.
*G06F 9/44* (2006.01)
(52) U.S. Cl. .................. 717/168; 717/171; 717/177
(58) Field of Classification Search ........ 717/168–178; 709/218–226

See application file for complete search history.

(56) References Cited

U.S. PATENT DOCUMENTS

| | | | | |
|---|---|---|---|---|
| 5,920,725 A | * | 7/1999 | Ma et al. .................... | 717/171 |
| 6,138,274 A | * | 10/2000 | Huang et al. ................ | 717/168 |
| 6,360,363 B1 | * | 3/2002 | Moser et al. ................ | 717/170 |
| 6,557,054 B1 | * | 4/2003 | Reisman ...................... | 710/33 |
| 6,578,198 B1 | * | 6/2003 | Freeman et al. ............ | 717/168 |
| 6,714,979 B1 | * | 3/2004 | Brandt et al. ............... | 709/225 |
| 6,745,382 B1 | * | 6/2004 | Zothner ...................... | 717/107 |
| 6,842,906 B1 | * | 1/2005 | Bowman-Amuah .......... | 719/330 |
| 6,874,142 B1 | * | 3/2005 | Ogura ......................... | 717/170 |
| 6,874,143 B1 | * | 3/2005 | Murray et al. .............. | 717/173 |

FOREIGN PATENT DOCUMENTS

WO   WO 02/091178 A2 * 11/2002

OTHER PUBLICATIONS

Michaloski et al, "An open system framework for component based CNC machines", ACM pp 1-6, 2000.*
Hicks et al, "Dynamic software updating", ACM PLDI, pp 13-23, 2001.*
Killijian et al, "Portable serialization of CORBA objects a reflective approach", ACM OOPSLA, pp 68-82, 2002.*
Kapolka et al, "A unified component framework for dynamically extensible virtual environments", ACM CVE, pp 64-69,2002.*
Horstmann et al., "Core JAVA vol. 1—Fundamentals", Sun Microsystems, Inc. 2001, Ch. 8, pp. 347-415.
"The Industry-Backed Server-Side Component Architecture", Enterprise JavaBeans™ technology, Sun Microsystems, Inc., (2001) Download from java.sun.com, 2 pp.

* cited by examiner

*Primary Examiner*—Anil Khatri
(74) *Attorney, Agent, or Firm*—Beyer Weaver & Thomas,LLP

(57) ABSTRACT

Techniques for online upgrading of software components are disclosed. The techniques are especially suited for online upgrading of container-based software components in object oriented computing environments. A multi-stage online upgrade system can facilitate online installation of the container-based software components (e.g., applications) in object oriented computing environments. Moreover, online software upgrades can be achieved without interrupting online services which are provided by the container-based software components. The multi-stage online upgrade system can be implemented so as to allow interaction with an upgrade management entity (e.g., an application developer or system administrator). This allows controlling and/or monitoring of the online upgrade operations.

16 Claims, 8 Drawing Sheets

US 7,000,228 B2

ONLINE UPGRADE OF CONTAINER-BASED SOFTWARE COMPONENTS

FIELD OF THE INVENTION

The present invention relates to object oriented computing environments, and more particularly, to techniques for upgrading container-based software components.

BACKGROUND OF THE INVENTION

Recently, container-based software components have been developed for object oriented computing environments. These software components (e.g., application programs) can interact with a "container" which can typically provide various standard functions (e.g., security, networking, etc.). This offers many advantages, for example, ease of use and reusability.

To elaborate, in Sun Microsystems' Enterprise JavaBeans component architecture, and in Microsoft Corporation's Component Object Model (COM), a container is an application program or subsystem in which the program building block known as a component is run. For example, a component, such as a button, a small calculator, or a database requester, can be developed using Enterprise JavaBeans that can run in application servers.

In today's computing environments, there is often a need to upgrade software components. As such, it is desirable to perform software upgrades in an efficient way. Moreover, for some applications, it is highly desirable to perform software upgrades without having to shut down the system. Unfortunately, conventional techniques do not allow software upgrades to be performed without having to shut down the system or otherwise degrade the performance of the system in some other manner. Typically, services being performed have to be interrupted to allow for the upgrade. In some cases, interruption of services can be very costly, thus need to be avoided.

In view of the foregoing, there is a need for improved techniques for upgrading software components.

SUMMARY OF THE INVENTION

Broadly speaking, the invention relates to techniques for online upgrading of software components. The invention is especially suited for online upgrading of container-based software components in object oriented computing environments. In accordance with one aspect of the invention, a multi-stage online upgrade system is disclosed. As will be appreciated, the multi-stage online upgrade system can facilitate online installation of the container-based software components (e.g., applications) in object oriented computing environments. Moreover, online software upgrades can be achieved without interrupting online services which are provided by the container-based software components. The multi-stage online upgrade system can be implemented so as to allow interaction with an upgrade management entity (e.g., an application developer or system administrator). This allows controlling and/or monitoring of the online upgrade operations. Other aspects of the invention provide techniques suitable for performing online upgrades of container-based software components. As will be appreciated, online upgrades of the container-based software components can be implemented in multiple stages.

The invention can be implemented in numerous ways, including as a system, an apparatus, a method, or a computer readable medium. Several embodiments of the invention are discussed below.

As an object oriented computing environment one embodiment of the invention includes: a first container based software component being an upgraded version of a second container based software component, a container suitable for interaction with the first container based software component, and an online upgrade system capable of operating to facilitate online upgrading of said second container based software component to said first container based software component.

As a method of upgrading software in a object oriented computing environment, one embodiment of the invention includes the acts of: loading an online upgrade module, notifying an online-upgrade controller to initiate an online upgrade process, and performing one or more operations to facilitate online upgrade of said second container based software component to said first container based software component. The online upgrade module includes a first container based software component, an online upgrade listener and an online upgrade specification. The first container based software component being an upgrade of a second container based software component.

As a method of upgrading container based software components in multiple stages one embodiment of the invention includes: an upgrade prepare stage, a pre-upgrade stage, one or more upgrade operations, and a post-upgrade stage.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention pertains to techniques for online upgrading of software components. The invention is especially suited for online upgrading of container-based software components in object oriented computing environments. In accordance with one aspect of the invention, a multi-stage online upgrade system is disclosed. As will be appreciated, the multi-stage online upgrade system can facilitate online installation of the container-based software components (e.g., applications) in object oriented computing environments. Moreover, online software upgrades can be achieved without interrupting online services which are provided by the container-based software components. The multi-stage online upgrade system can be implemented so as to allow interaction with an upgrade management entity (e.g., an application developer or system administrator). This allows controlling and/or monitoring of the online upgrade operations. Other aspects of the invention provide techniques suitable for performing online upgrades of container-based software components. As will be appreciated, online upgrades of the container-based software components can be implemented in multiple stages.

Embodiments of the invention are discussed below with reference to FIGS. 1A–7. However, those skilled in the art will readily appreciate that the detailed description given herein with respect to these figures is for explanatory purposes as the invention extends beyond these limited embodiments.

Figure 1A:
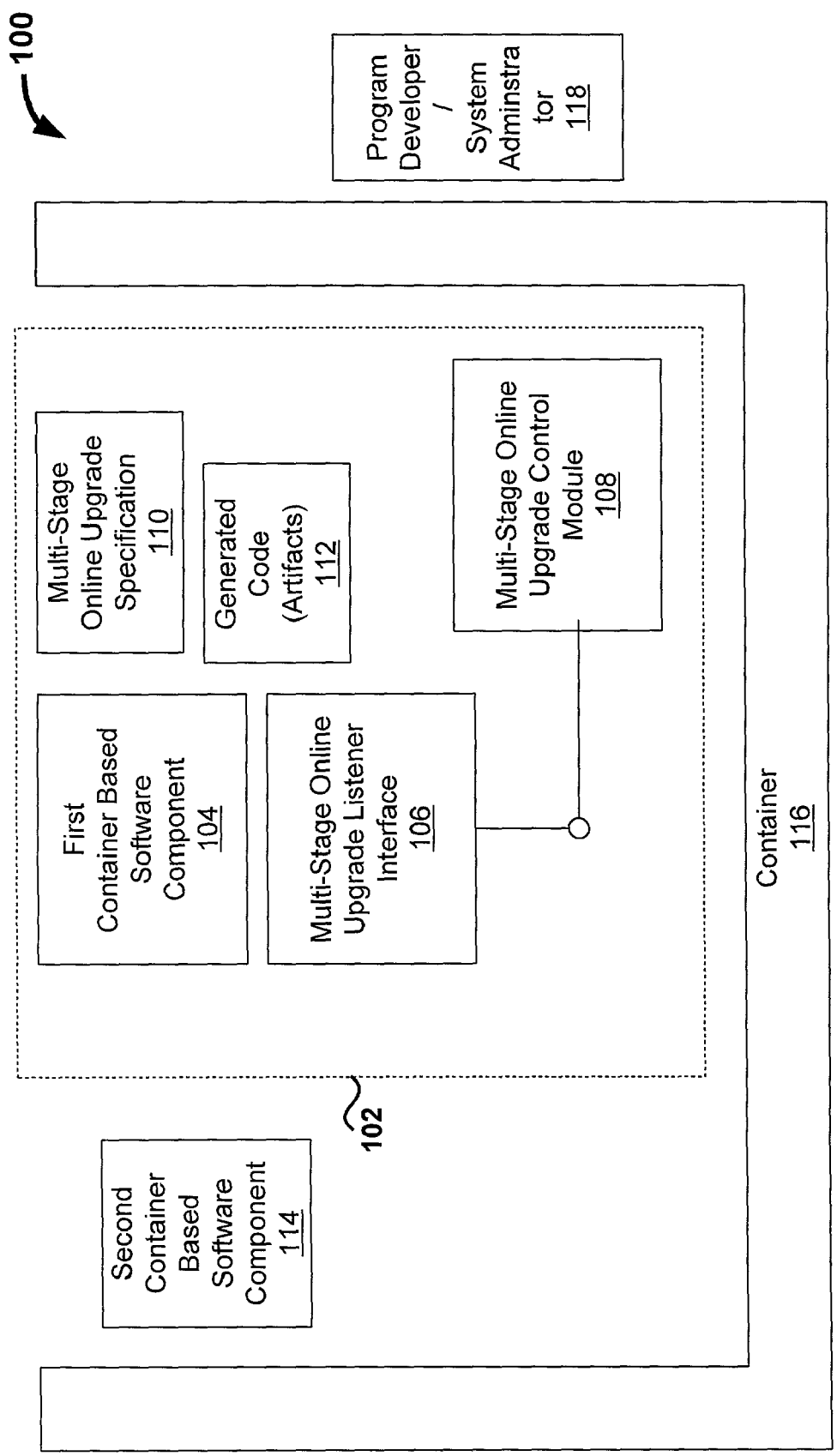
FIG. 1A illustrates an object oriented computing environment including a multi-stage online upgrade system in accordance with one embodiment of the invention.

FIG. 1A illustrates an object oriented computing environment 100 including a multi-stage online upgrade system 102 in accordance with one embodiment of the invention. The multi-stage online upgrade system 102 includes a first container-based software component 104, a multi-stage online upgrade listener interface 106, a multi-stage online upgrade controller 108, a multi-stage online upgrade specification 110, and generated code (artifacts) 112.

The first container-based software component 104 represents an upgraded version of a second container-based software component 116. The second container-based software component operates in a container 116 of the object oriented computing environment 100. The container 116 can, for example, represent a standard interface which implements various functions (e.g., security, networking, etc.). The first or second container-based software components 104 and 114, for example, can be Enterprise JavaBeans II applications developed in accordance with Sun Microsystems' specifications.

As will be appreciated, the multi-stage online upgrade system 102 can facilitate online installation of the first container-based software component 104 in the object oriented computing environment 100. Moreover, online software upgrades can be performed without interrupting services that are typically performed by first or second container-based software components 104 and 114. In other words, at least one of the first or second container-based software components 104 and 114 are operable while the multi-stage online upgrade system 102 is upgrading the object oriented computing environment 102 (i.e., replacing the second container-based software component 114 to the first container-based software component 104).

As noted above, the multi-stage online upgrade system 102 can include the multi-stage online upgrade control module 108. In the described embodiment, the multi-stage online upgrade control module 108 is capable of interacting with the multi-stage online upgrade listener interface 106 to facilitate online installation of the first container-based software component 104. The multi-stage online upgrade listener interface 106 can access the first container-based software component 104, as well as the second container-based software component 114. It should be noted that at least a portion of the multi-stage online upgrade control module 108 can be implemented in the container 116. Furthermore, the multi-stage online upgrade control module 108 can be in communication with a program developer or system administrator 118. In this way, online upgrading can be controlled and/or monitored by a human operator.

It should also be noted that the multi-stage online upgrade specification 110 can provide information regarding the upgrade. The generated code (artifacts) 112 can represent the code which is generated for the operation of the second container-based software component 104. As will be appreciated, when the online upgrade operations have successfully been completed and the first container-based software component 104 is fully operable the second container-based software component 114 can be removed. However, it should be noted that first and second container-based software components 104 and 114 may simultaneously be operable during the online upgrading process. As will be appreciated, this means that it is possible to "roll back" to the second container-based software component 114 during the online upgrading process, for example, in the event the upgrade is unsuccessful or the upgrade process is terminated. In any case, the multi-stage online upgrade system 102 allows software components to be upgraded without interruption to services provided by them.

Figure 1B:
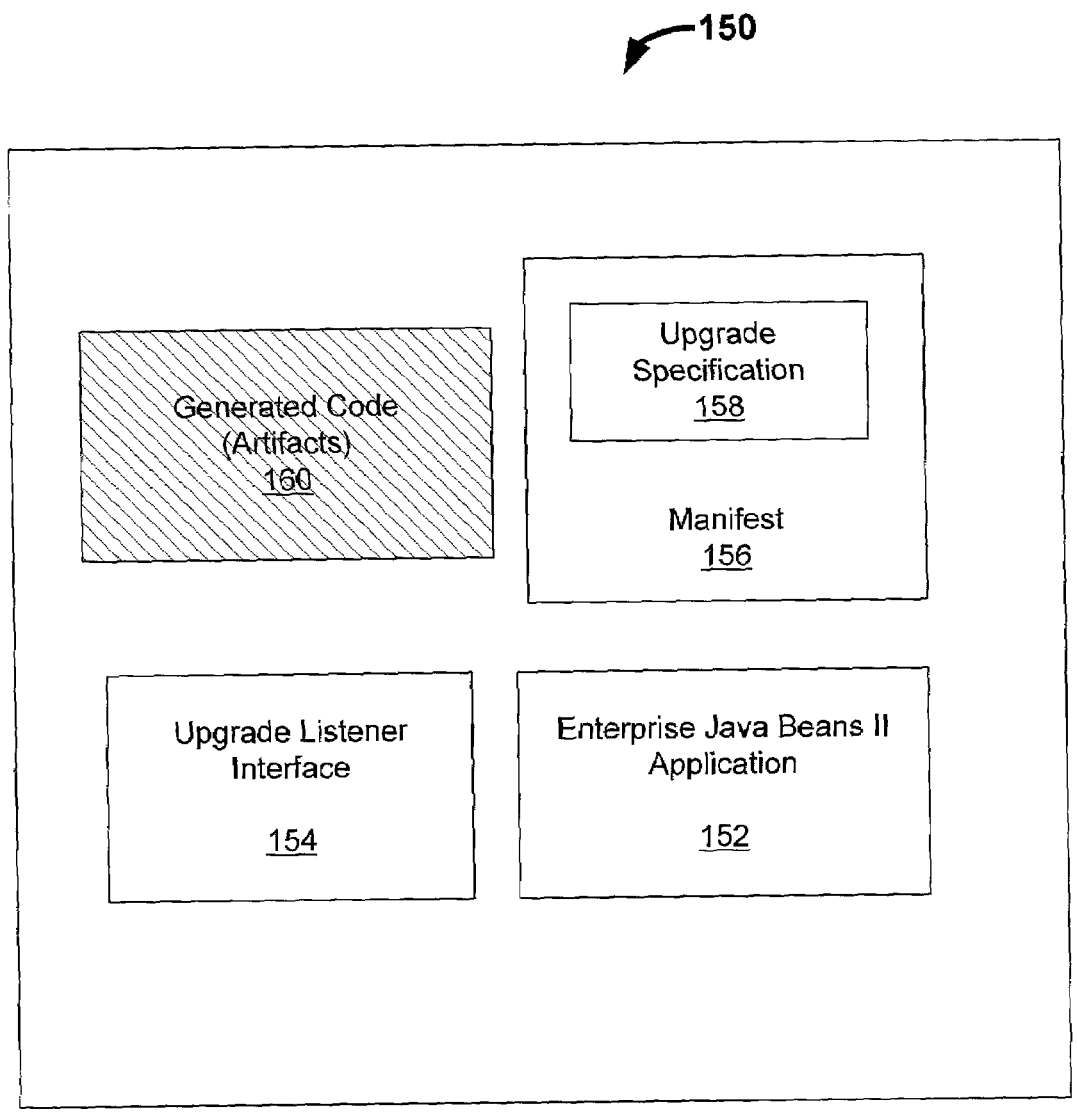
FIG. 1B illustrates an exemplary online upgrade package in accordance with one embodiment of the invention.

As will be appreciated, one or more components of the multi-stage online upgrade system 102 can be packed in a software package. FIG. 1B illustrates an exemplary online upgrade package 150 in accordance with one embodiment of the invention. The online upgrade package 150 includes an Enterprise JavaBeans II application 152, an upgrade listener interface 154, and a manifest 156 which includes an upgrade specification 158. It should be noted that online upgrade package 150 can also include a generated code (artifact) 160.

Figure 2:
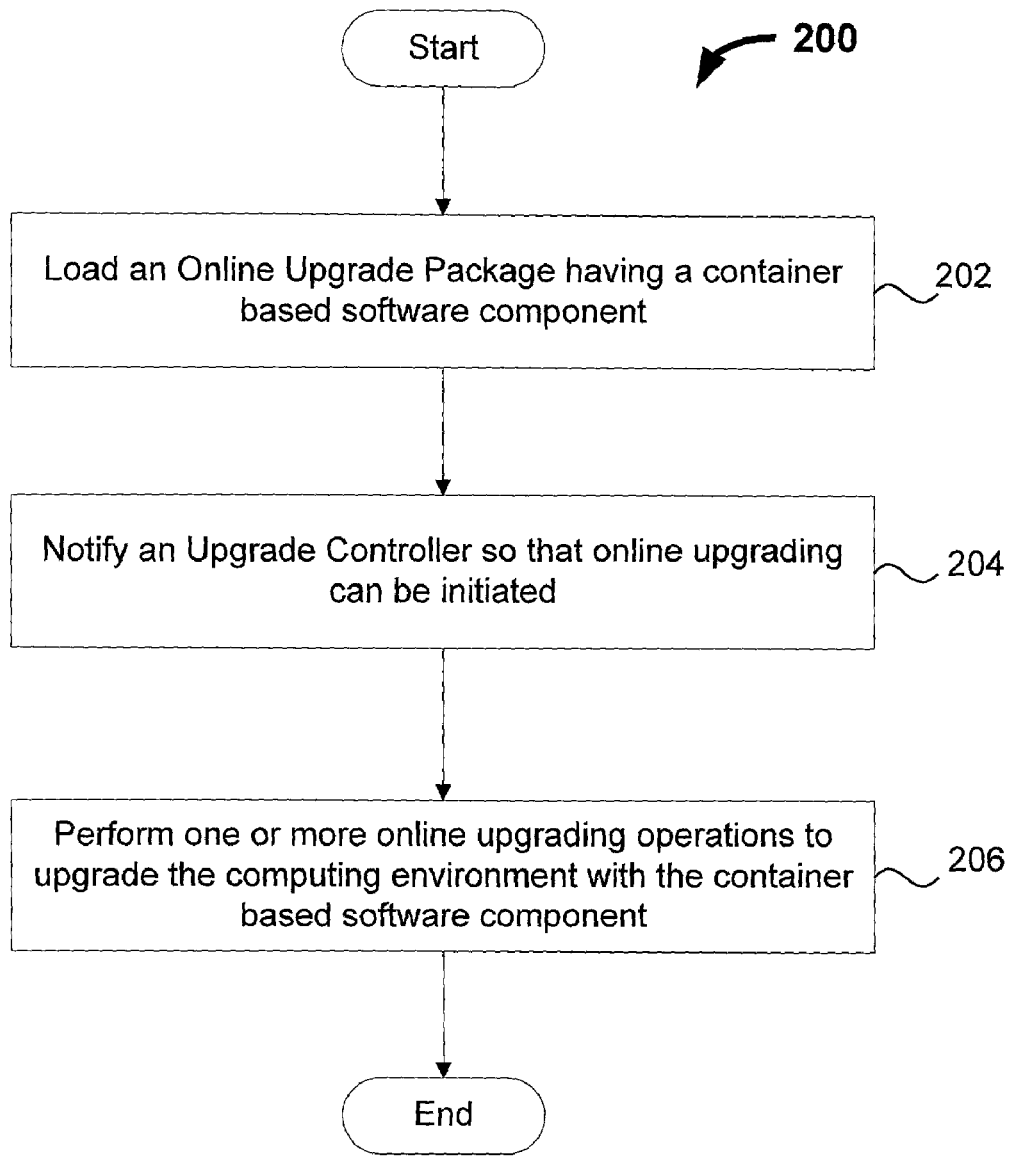
FIG. 2 illustrates an online upgrade method in accordance with one embodiment of the invention.

FIG. 2 illustrates an online upgrade method 200 in accordance with one embodiment of the invention. Initially, at operation 202, an online upgrade package is loaded. The online upgrade package includes a container-based software component. Typically, the container-based software component needs to be installed to upgrade a computing environment with a newer version of a software component. As noted above, an online upgrade package can also include other components, for example, an upgrade listener interface and a manifest which includes an upgrade specification.

After the online upgrade package is loaded, an upgrade controller (e.g., multi-stage online upgrade control module 108 of FIG. 1A) is notified at operation 204 so that the online upgrading of a software component can be initiated. Next, at operation 206, one or more online upgrade operations are performed to upgrade the computing environment with the container-based software component of the online upgrade package. The online upgrade method 200 ends following operation 206.

Figure 3:
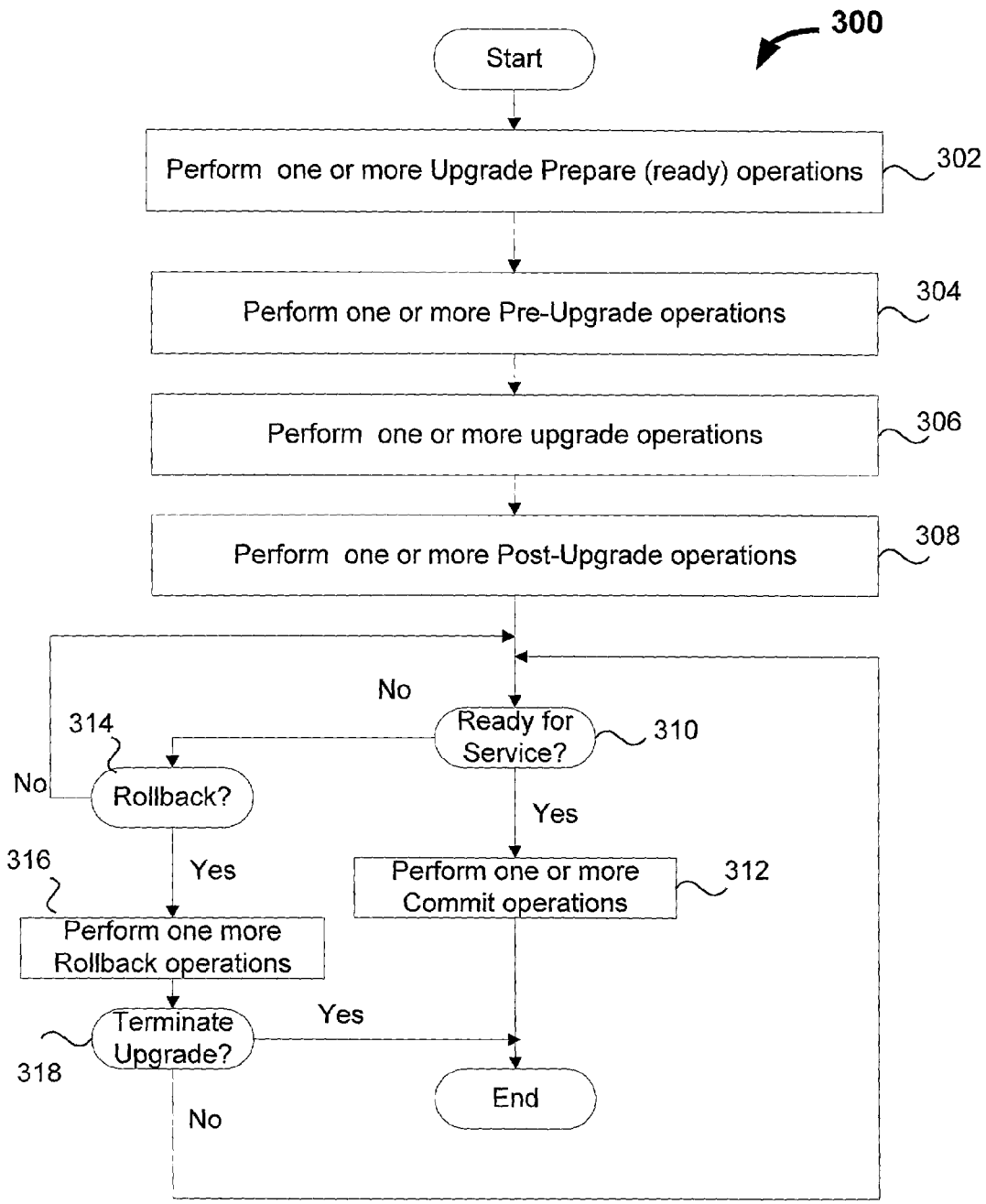
FIG. 3 illustrates a method for performing online upgrade operations in accordance with one embodiment of the invention.

As noted above, the online upgrade operations can be performed in two or more stages. FIG. 3 illustrates a method 300 for performing online upgrade operations in accordance with one embodiment of the invention. The method 300 represents on line operations that can be performed, for example, by the operation 206 of FIG. 2. Initially, at operation 302, one or more upgrade prepare (ready) operations are performed. Next, at operation 304, one or more pre-upgrade operations are performed. Thereafter, at operation 306, one or more upgrade operations are performed. After the upgrade operations, one or more post-upgrade operations are performed at operation 308.

Next, at operation 310, a determination is made as to whether the software upgrade is ready for service. If it is determined at operation 310 that the software upgrade is ready for service, the method 300 proceeds to operation 312 where one or more commit operations are performed. As will be appreciated, after the commit operations are performed, the old version of the software can be taken offline and/or removed. The method 300 ends following operation 312.

On the other hand, if it is determined at operation 310 that the upgrade software is not ready for service, the method 300 proceeds to operation 314 where a determination is made as to whether any rollback operations should be performed. If it is determined at operation 314 that there is no need to perform any rollback operations, the method 300 proceeds to operation 310 where it is determined whether the software is ready for service. However, if it is determined at operation 314 that at least one rollback operation should be performed, the method 300 proceeds to operation 316 where one or more rollback operations are performed. As will be appreciated by those skilled in the art, the rollback operations, among other things, can ensure the integrity of the computing environment (e.g., integrity of a data). After operation 316, the method 300 proceeds to operation 318 where a determination is made as to whether to terminate the online upgrade process. The method 300 ends if it is determined at operation 318 that the online upgrade process should be terminated. However, if it is determined at operation 318 that the online upgrade process should not be terminated, the method 300 proceeds to operation 310 where it is determined whether the software upgrade is ready for service. Thereafter, the method 300 proceeds in the same manner as described above. The method 300 ends following the commit operations 312 or after operation 318 if it is determined that online upgrade processing operations should be terminated.

Figure 4:
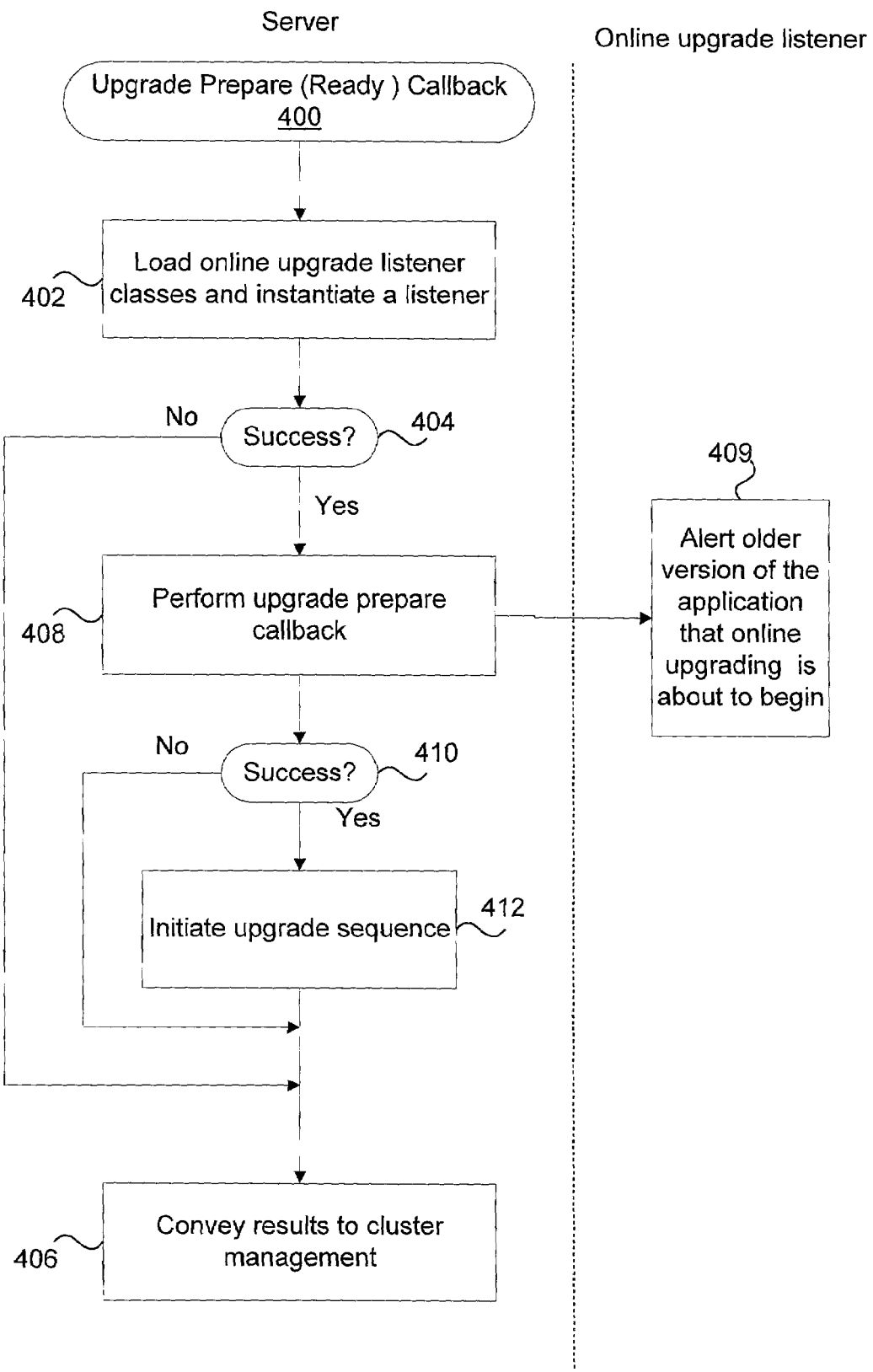
FIG. 4 illustrates an exemplary method for performing upgrade prepare (ready) callbacks in accordance with one embodiment of the invention.

FIG. 4 illustrates an exemplary method 400 for performing upgrade prepare (ready) callbacks in accordance with one embodiment of the invention. The method 400 represents, for example, the operations that can be performed by the upgrade prepare stage 302 of FIG. 3. In the described embodiment, the method 400 demonstrates interactions between a server (e.g., an Enterprise JavaBeans II server) and an online upgrade listener (e.g., multi-stage online upgrade listener interface 106 of FIG. 1A). As will be appreciated by those skilled in the art, the server can be implemented, for example, as a cluster (i.e., two or more computing nodes that can be coupled together).

At operation 402, online upgrade listener classes are loaded and a listener is instantiated. Next, at operation 404, a determination is made as to whether the online upgrade listener classes are successfully loaded and the listener is successfully instantiated. If it is determined at operation 404 that the online upgrade listener classes are not successfully loaded or the listener is not successfully instantiated, the method 400 proceeds to operation 406 where the results are conveyed to the cluster management, allowing the cluster management to take appropriate action.

However, if the online upgrade listener classes are successfully loaded and the listener is successfully instantiated, the method 400 proceeds to operation 408 where upgrade prepare callbacks are performed. In addition, at operation 409, the old version of the application is alerted that the online upgrading is about to begin. Next, at operation 410, a determination is made as to whether the upgrade prepare callbacks were successfully performed. If it is determined at operation 410 that the callbacks were successfully performed, the method 400 proceeds to operation to 412 where the upgrade sequence is initiated. However, if it is determined at operation 410 that the callbacks were not successfully performed, the method 400 proceeds to operation 406 where the results are conveyed to the cluster management, this allowing the cluster management to take appropriate action (e.g., terminate the upgrade prepare stage, restart the upgrade ready stage, etc.).

Figure 5:
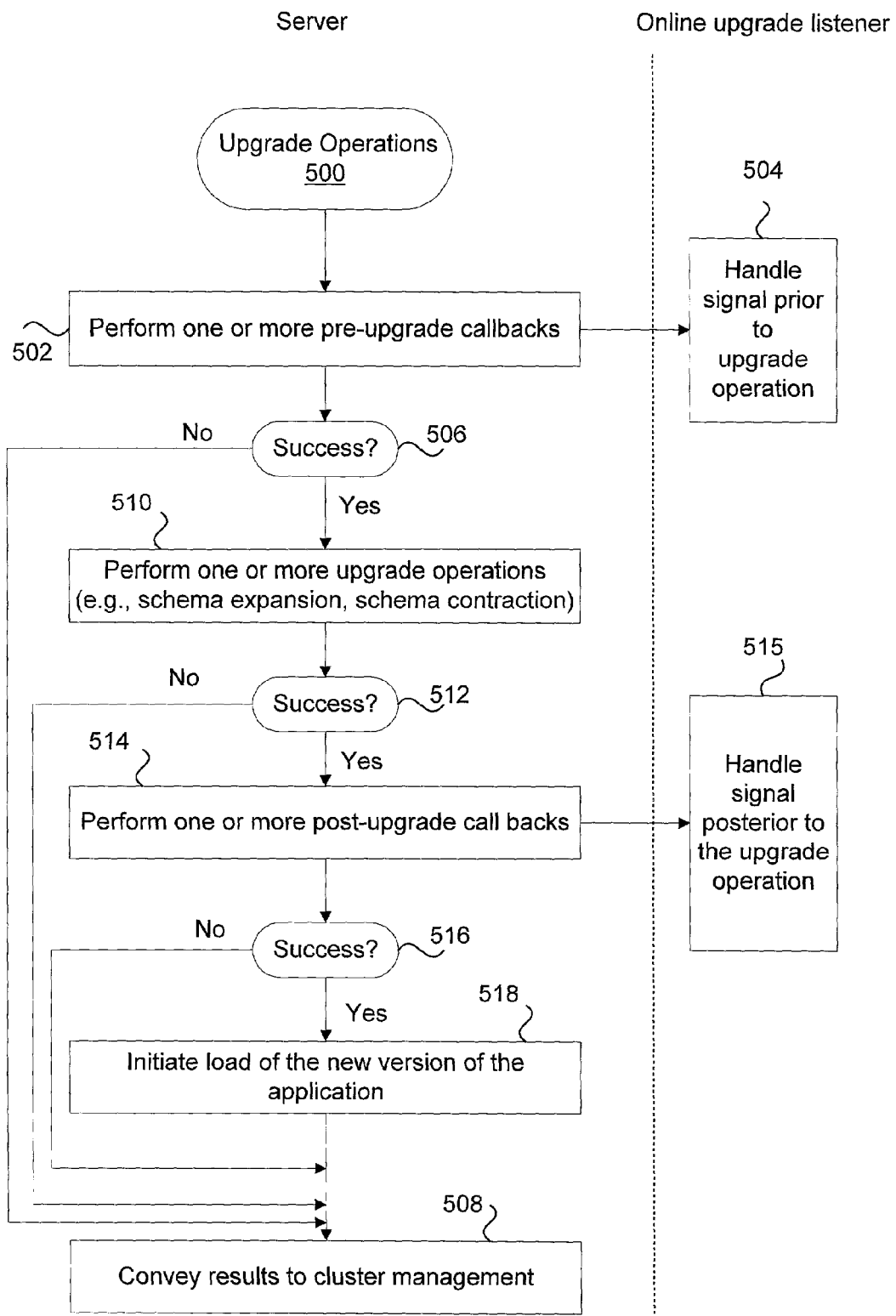
FIG. 5 illustrates a method for performing online upgrade operations.

FIG. 5 illustrates a method 500 for performing online upgrade operations. In the described embodiment, the upgrade operations include: pre-upgrade callbacks, upgrade operations, and post-upgrade operations. The method 500 represents, for example, the operations that can respectively be performed at the pre-upgrade, upgrade, and post-upgrade stages 304, 306 and 308 of FIG. 3. In the described embodiment, the method 500 demonstrates interactions between a server (e.g., an Enterprise JavaBeans II server) and an online upgrade listener (e.g., the multi-stage online upgrade listener 106 of FIG. 1A). Again, the server can be implemented, for example, as a cluster (i.e., two or more computing nodes that can be coupled together).

Initially, at operation 502, one or more pre-upgrade callbacks are performed. In addition, at operation 504, the signal prior to upgrade operation is handled. Next, at operation 506, a determination is made as to whether the pre-upgrade callbacks have been performed successfully. If it is determined at operation 506 that the pre-upgrade callbacks were not performed successfully, the method 500 proceeds to operation 508 where the results are conveyed to the cluster management, allowing the cluster management to take appropriate action. However, if it is determined at operation 506 that the pre-upgrade callbacks have been performed successfully, the method 500 proceeds to operation 510 where one or more upgrade operations are performed. These upgrade operations, for example, can be schema expansion or schema contraction for a database application.

Next, at operation 512, a determination is made as to whether the upgrade operations were performed successfully. If it is determined at operation 512 that the upgrade operations were not performed successfully, the method 500 proceeds to operation 508 where the results are conveyed to the cluster management. However, if it is determined at operation 512 that the upgrade operations were performed successfully, the method 500 proceeds to operation 514 where one or more post-upgrade call backs. In addition, at operation 515, the signal posterior to the upgrade operation is handled.

Thereafter, at operation 516, a determination is made as to whether the post-upgrade callbacks were performed successfully. If it is determined at operation 516 that the post-upgrade callbacks were not performed successfully, the method 500 proceeds to operation 508 where the results are conveyed to the cluster management. However, if it is determined at operation 516 that the post-upgrade callbacks were performed successfully, the method 500 proceeds to operation 518 where loading of the new version of the application is initiated.

Figure 6:
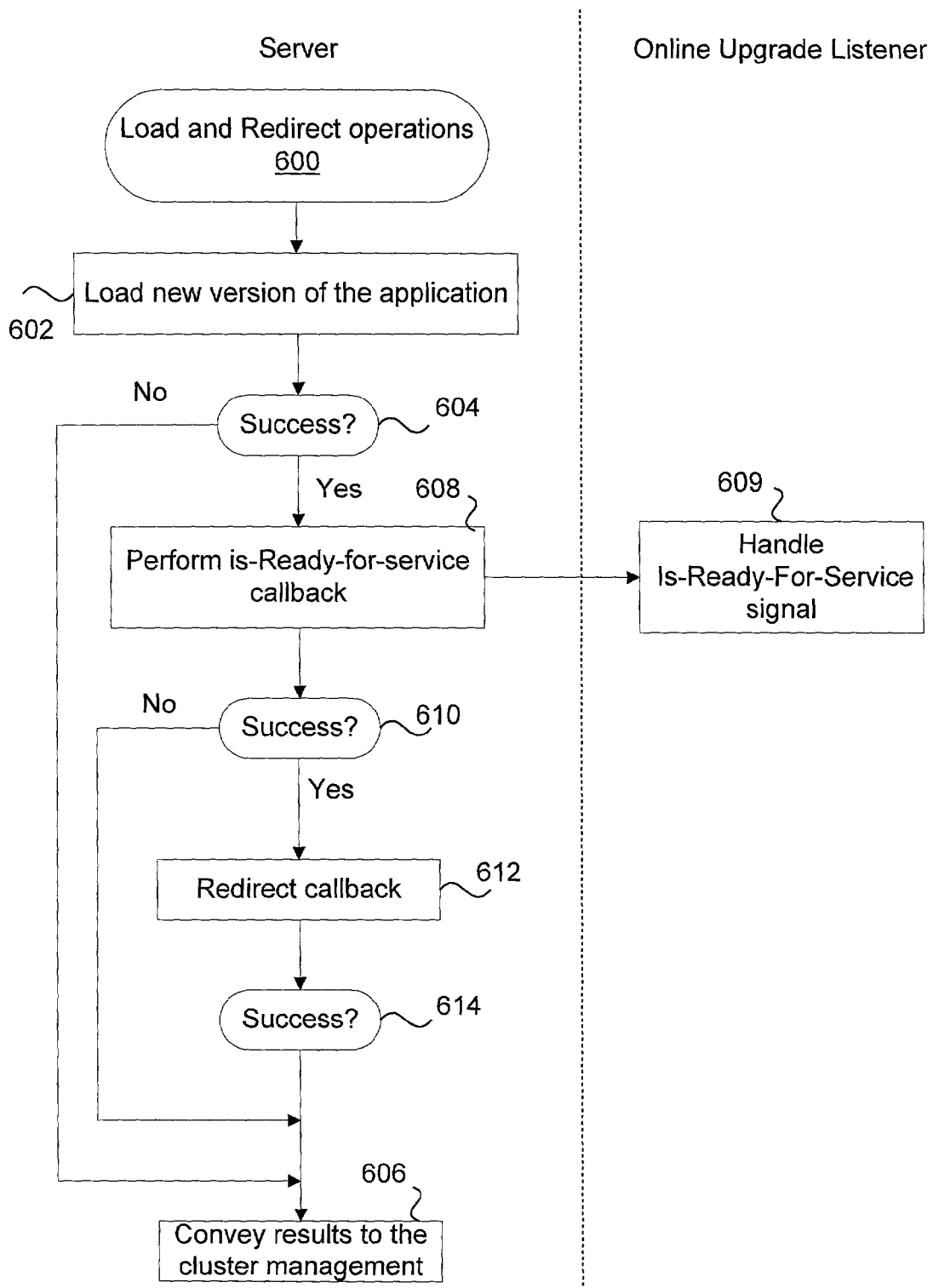
FIG. 6 illustrates a method for performing load and redirect operations upgrade operations.

FIG. 6 illustrates a method 600 for performing load and redirect operations upgrade operations. The method 600 represents, for example, the operations that can be performed at operation 310 FIG. 3. In the described embodiment, the method 600 demonstrates interactions between a server (e.g., an Enterprise JavaBeans II server) and an online upgrade listener (e.g., multi-stage online upgrade listener interface 106). Again, the server can be implemented, for example, as a cluster.

At operation 602, the new version of the application is loaded. Next, at operation 604, a determination is made as to whether the new version of the application was loaded successfully. If it is determined at operation 604 that the new version of the application was not loaded successfully, the method 600 proceeds to operation 606 where the results are conveyed to the cluster management. However, if it is determined at operation 606 that the new version of the application was loaded successfully, the method 600 proceeds to operation 608 where a "is-ready-for-service" callback is performed. In addition, at operation 609, the "is-ready-for-service" signal is handled.

Next, at operation 610, a determination is made as to whether the "is-ready-for-service" callback was performed successfully. If it is determined at operation 610 that the "is-ready-for-service" callback was not performed successfully, the method 600 proceeds to operation 606 where the results are conveyed to the cluster management. However, if it is determined at operation 610 that the "is-ready-for-service" callback was performed successfully, the method 600 proceeds to operation 612 where a redirect callback is performed. Next, at operation 614, it is determined whether the redirect callback is performed successfully. Thereafter, at operation 606, the result of the determination made at operation 614 are conveyed to the cluster management.

Figure 7:
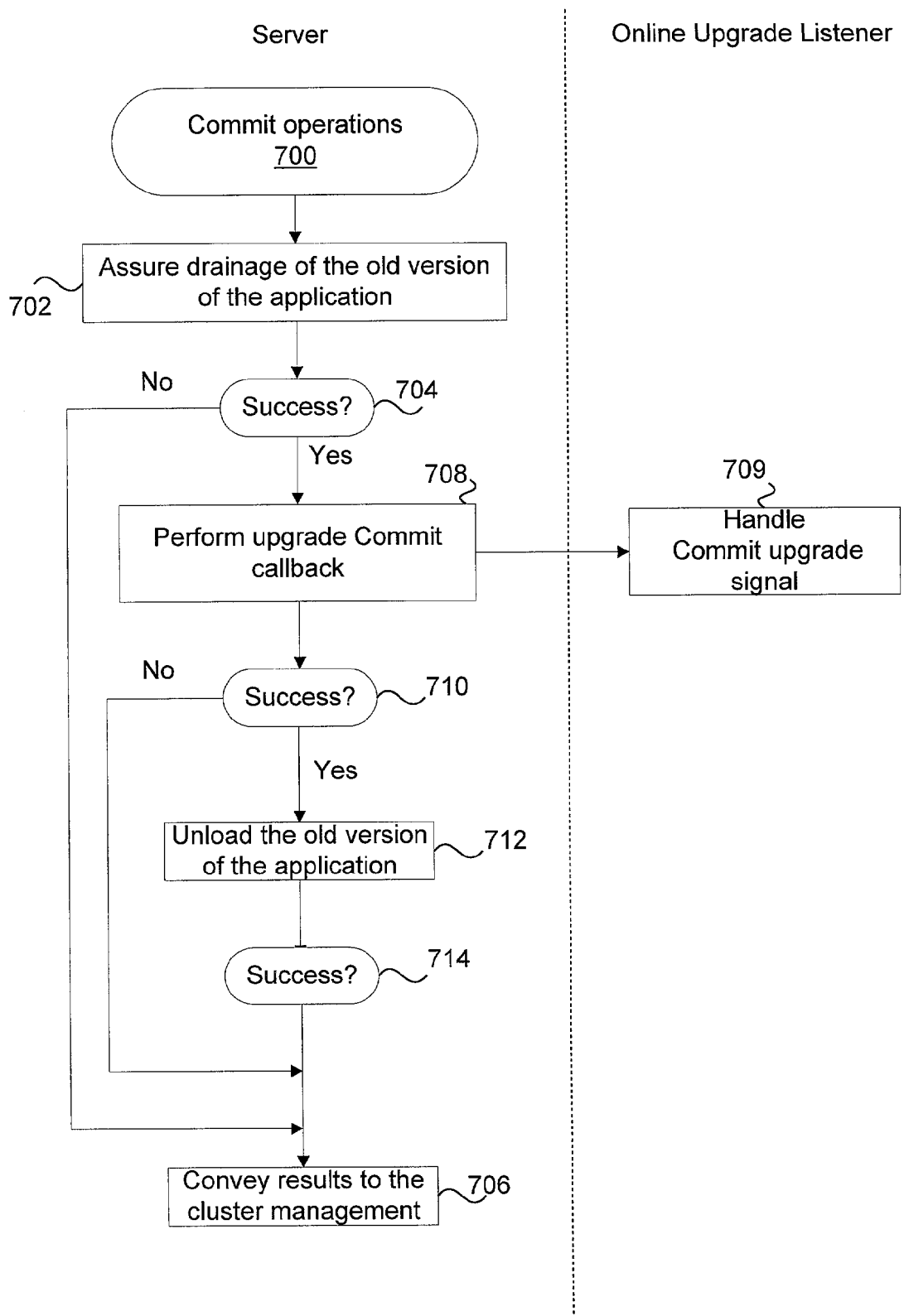
FIG. 7 illustrates a method for performing commit operations.

FIG. 7 illustrates a method 700 for performing commit operations. The method 700 represents, for example, the operations that can be performed at operation 312 of FIG. 3. In the described embodiment, the method 700 demonstrates interactions between a server (e.g., a Enterprise s II server) and an online upgrade listener (e.g., multi-stage online upgrade listener interface 106 of FIG. 1A, or upgrade listener interface 154 of FIG. 4). The server can be implemented, for example, as a cluster. Initially, at operation 702, it is assured that the old version of the application is drained. Next, at operation 704, a determination is made as to whether the drainage of the old version of the application was successful. If it is determined at operation 704 that the drainage of the old version of the application was not successful, the method 700 proceeds to operation 706 where the results are conveyed to the cluster management. However, if it is determined at operation 704 that the drainage of the old version of the application was successful, the method 700 proceeds to operation 708 where the upgrade commit callback is performed. In addition, at operation 709, the upgrade commit signal is handled.

Next, at operation 710, a determination is made as to whether the upgrade commit callback has been performed successfully. If it is determined at operation 710 that the upgrade commit callback has been not performed successfully, the method 700 proceeds to operation 706 where the results are conveyed to the cluster management. However, if it is determined at operation 710 that the upgrade commit callback has been performed successfully, the method 700 proceeds to operation 712 where the old version of the application is unloaded. Thereafter, at operation 714, a determination is made as to whether the old version of the application was unloaded successfully. Accordingly, at operation 714, the results are conveyed to the cluster management.

The invention can use a combination of hardware and software components. The software can be embodied as computer readable code (or computer program code) on a computer readable medium. The computer readable medium is any data storage device that can store data which can thereafter be read by a computer system. Examples of the computer readable medium include read-only memory, random-access memory, CD-ROMs, magnetic tape, and optical data storage devices. The computer readable medium can also be distributed over network-coupled computer systems so that the computer readable code is stored and executed in a distributed fashion.

What is claimed is:

1. A method of upgrading software in a object oriented computing environment, said method comprising:
    loading an online upgrade module, said online upgrade module including a first container based software component, an online upgrade listener and an online upgrade specification, wherein said first container based software component is an upgrade of a second container based software component which is capable of operating in said object oriented computing environment;
    notifying an online-upgrade controller to initiate an online upgrade process;
    performing by the online-upgrade controller a plurality of operations to facilitate online upgrade of said second container based software component to said first container based software component;
    wherein said plurality of operations are performed in multiple stages comprising:
        an upgrade prepare stage;
        a pre-upgrade stage comprising: loading one or more listener classes associated with said online upgrade listener, instantiating said one or more listeners associated with said on-line upgrade listener, and performing one or more callbacks via said on-line upgrade listener;
        one or more upgrade operations;
        a post-upgrade stage, and
        a commit stage which comprises: assuring successful draining of said second container based software component, performing one or more callbacks, unloading said second container based software component; and conveying information about said assuring, performing, or unloading to a management entity.

2. A method as recited in claim 1, wherein said first container based software component said online upgrade listener, and said online upgrade specification are packaged together as a software package.

3. A method as recited in claim 2, wherein said online upgrade specification is implemented in a manifest portion of said software package.

4. A method as recited in claim 2, wherein said first container based software component is an Enterprise Java Bean II software component.

5. A method as recited in claim 1, wherein said online upgrade can be performed without interruption of services.

6. A method as recited in claim 1, wherein at least one of the first or second container based software components are operable during said software upgrade.

7. A method of upgrading container based software components in multiple stages, said method comprising:
    loading a first container based application program, said application program being a new version of a second container based application program;
    performing a callback to determine whether the first application program is ready for service;
    performing a redirect callback to the first application program; and
    conveying information to a management entity about said loading, or said callbacks;
    wherein said multiple stages of upgrading comprises:
        an upgrade prepare stage;
        a pre-upgrade stage;
        one or more upgrade operations; and
        a post-upgrade stage.

8. A method as recited in claim 7,
wherein said method further comprises a commit stage;
wherein said commit stage includes:
   assuring draining an older version of an application program;
   performing one or more callbacks; and
   unloading said older version of application program; and
   conveying information about said assuring, performing, or unloading to a management entity.

9. A method as recited in claim 8, wherein said upgrade prepare stage comprises:
   conveying information about said loading, instantiation, or performing to a management entity.

10. A method as recited in claim 9, wherein said management entity is a cluster manager.

11. A method as recited in claim 7, wherein said two or more stages further comprise:
   a rollback stage.

12. A method as recited in claim 7, wherein said two or more stages further comprise of at feast one of a commit stage and a rollback stage.

13. A method as recited in claim 7,
wherein said upgrade pre-upgrade stage comprises performing one or more callbacks;
wherein said post-upgrade operations comprises one or more callbacks.

14. A method as recited in claim 13, wherein said method further comprises conveying information to a management entity.

15. A method as recited in claim 14, wherein said management entity is a cluster manager.

16. A computer system for upgrading software in a object oriented computing environment, wherein said computer system is capable of:
   upgrading software in a object oriented computing environment; said method comprising:
   loading an online upgrade module, said online upgrade module including a first container based software component, an online upgrade listener and an online upgrade specification, wherein said first container based software component is an upgrade of a second container based software component which is capable of operating in said object oriented computing environment;
   notifying an online-upgrade controller to initiate an online upgrade process;
   performing by the online-upgrade controller a plurality of operations to facilitate online upgrade of said second container based software component to said first container based software component;
   wherein said plurality of operations are performed in multiple stages comprising:
      an upgrade prepare stage;
      a pre-upgrade stage comprising: loading one or more listener classes associated with said online upgrade listener, instantiating said one or more listeners associated with said on-line upgrade listener, and performing one or more callbacks via said on-line upgrade listener;
      one or more upgrade operations;
      a post-upgrade stage, and
      a commit stage which comprises: assuring successful draining of said second container based software component performing one or more callbacks, unloading said second container based software component; and conveying information about said assuring, performing, or unloading to a management entity.

* * * * *

UNITED STATES PATENT AND TRADEMARK OFFICE
CERTIFICATE OF CORRECTION

PATENT NO. : 7,000,228 B2  Page 1 of 1
APPLICATION NO. : 10/052304
DATED : February 14, 2006
INVENTOR(S) : Masood Seyed Mortazavi It is certified that error appears in the above-identified patent and that said Letters Patent is hereby corrected as shown below:

In the Claims:

In line 2 of claim 12 (column 9, line 21) change "at feast" to --at least--.

Signed and Sealed this

Twenty-second Day of August, 2006

JON W. DUDAS
*Director of the United States Patent and Trademark Office*